United States Patent [19]

Diehl

[11] 4,155,374
[45] May 22, 1979

[54] INTERNAL CHECK BALL RETAINER

[75] Inventor: William K. Diehl, Waterloo, Iowa

[73] Assignee: Deere & Company, Moline, Ill.

[21] Appl. No.: 835,496

[22] Filed: Sep. 22, 1977

[51] Int. Cl.² ............................................. F16K 15/04
[52] U.S. Cl. ........................... 137/519.5; 137/533.15
[58] Field of Search .................. 137/515, 515.5, 519.5, 137/528, 533.11, 533.13, 533.15

[56] References Cited

U.S. PATENT DOCUMENTS

| 1,901,217 | 3/1933 | Yerkes | 137/533.13 |
| 3,219,057 | 11/1965 | Knowles | 137/533.13 X |
| 4,071,045 | 1/1978 | Brandt | 137/533.11 X |

Primary Examiner—Robert G. Nilson

[57] ABSTRACT

An internal check ball retainer for use in an in line check valve assembly has a M-shape configuration with a rectangular cross section. The in line check valve assembly includes a check valve having a check ball hole connected to a smaller through hole by a ball seat. A check ball is positioned in the check ball hole and is movable against the ball seat to block the through hole. The internal check ball retainer is dispositioned so as to dispose the check ball between the parallel arms of the M-shaped configuration and abuttable with the vertex of the V-shaped portion of the internal check ball retainer. A connector having a through-hole provided therein is threaded into the check ball hole so as to abut the internal check ball retainer and hold it in place while the V-shaped portion of the M prevents the check ball from blocking the through-hole in the connector.

6 Claims, 3 Drawing Figures

INTERNAL CHECK BALL RETAINER

BACKGROUND OF THE INVENTION

The present invention relates generally to in line check valve assemblies and more particularly to an internal check ball retainer for these assemblies.

In the past, a check valve assembly would be provided with a drilled and reamed hole to intersect the check ball hole for insertion of a precision dowel pin to prevent the check ball from blocking the through hole in the connector. The disadvantages associated with the dowell pin includes: the cost of drilling and reaming the hole; the cost of the precision pin; the external leakage around the pin which occurred with high system pressures and cycling; and the difficulty of removing the pin for maintenance of the check ball and check ball seat.

SUMMARY OF THE INVENTION

The present invention provides an internal check ball retainer which may be inserted into the check ball hole of the check valve and which may be held in place by the connector. The internal check ball retainer has an M-shaped configuration and is positioned so as to dispose the check ball between the parallel portions of the M configuration while the V-portion of the M configuration prevents the check ball from blocking the through hole in the connector. The internal check ball retainer provides a positive retainer for the check ball which always maintains proper orientation with the check ball and cannot work loose. It is easily manufactured and can be easily removed from the check valve for maintenance.

The above and additional advantages of the present invention will become apparent to those skilled in the art from a consideration of the following detailed description of the preferred embodiments when taken in conjunction with the accompanying drawings.

DESCRIPTION OF THE PREFERRED EMBODIMENT

Figure 1:
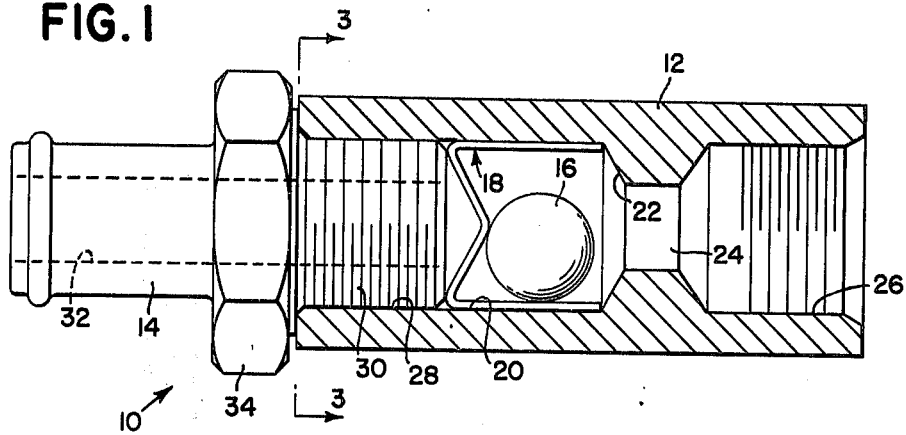
FIG. 1 is a cross-sectional view of an in line check valve assembly including the present invention.

Referring now to FIG. 1, therein is shown an in line check valve assembly 10 which includes a check valve 12, a connector 14, a check ball 16, and an internal check ball retainer 18.

The check valve 12 has provided therein a check ball hole 20 connected by a ball seat 22 to a through hole 24. The through hole 24 in turn is connected to a fitting hole 26. At the end of the check ball hole 20 opposite the ball seat 22 is a threaded portion 28 into which a threaded portion 30 of the connector 14 is engaged.

A connector 14 is provided with a through hole 32 and a nut portion 34 by which the connector 14 is tightenend into the check valve 12. In the preferred embodiment, the portion of the connector 14 opposite the threaded portion 30 is intended to be inserted in a relief valve (not shown).

Figure 2:
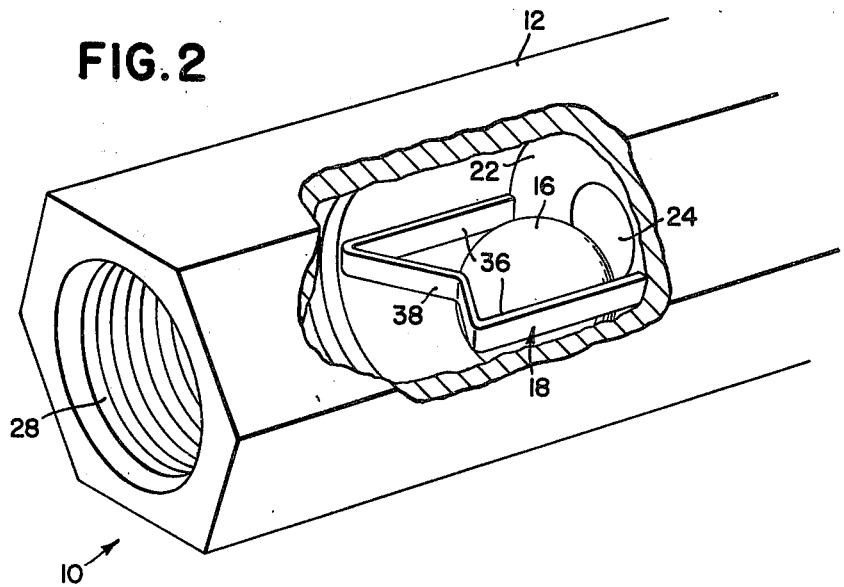
FIG. 2 is an isommetric view of the check valve including the present invention.

The connector 14 abuts the rectangular cross-section internal check ball retainer 18 which includes two parallel portions 36 connected by a V portion 38 as best seen in FIG. 2. The distance between the outside of the parallel portions 36 is such to allow the internal check ball retainer 18 to be easily inserted into the check ball hole 20. The V-portion 38 of the internal check ball retainer is configured to prevent the check ball 16 from blocking the through hole 32 of the connector 14 and is further configured to cooperate with the parallel portions 36 so as to allow the check ball 16 to move to a position where it provides a minimum restriction to flow through the through hole 24.

Figure 3:
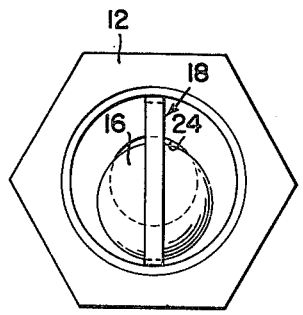
FIG. 3 is a cross-sectional view of FIG. 1 taken along the line 3—3.

In assembling the in line check valve assembly 10, the check ball 16 is first inserted into the check ball hole 20 followed by the check ball retainer 18 as best seen in FIG. 3. Both the check ball 16 and the internal check ball retainer are secured in the check valve 12 by tightening the connector 14 into the check valve 12. When assembled, the in line check valve assembly 10 will permit flow from the fitting hole 26 through to the through-hole 32 in the connector 14 with a minimum of restrictions while flow from the through-hole 32 to the fitting hole 26 will be blocked by the check ball 16 seating against the ball seat 22.

While the invention has been described in conjunction with a specific embodiment, it is to be understood that many alternatives, modifications, and variations will be apparent to those skilled in the art in light of the aforegoing description. For example, the preferred embodiment shows an internal check ball retainer 18 having a rectangular cross section, this cross section could easily be round. Accordingly, it is intended to embrace all such alternatives, modifications, and variations which fall within the spirit and scope of the appended claims.

I claim:

1. In a check valve assembly having a check valve with a check ball hole provided therein connected by a ball seat to a through-hole further provided therein, a connector with a through-hole provided therein engageable with the check valve, and a check ball positioned in the check valve movable to abut the ball seat and block the through-hole in the check valve, the improvement comprising: an internal check ball retainer formed from a flat strip having bends along its length in three locations to define a generally M-shaped configuration with a pair of parallel portions connected by a generally V-shaped portion, said internal check ball retainer being insertable in the check ball hole of the check valve so as to dispose the check ball between the parallel portions with the V-shaped portion proximate the connector.

2. The improvement as claimed in claim 1 wherein the check ball hole provided in the check valve is longer than the engaged length of the connector and the lengths of the parallel portions are equal to the difference in the length therebetween.

3. The improvement as claimed in claim 1 wherein the internal check ball retainer is of a rectangular cross section.

4. A check valve comprising: a check valve having a through-hole provided therein axially aligned with a check ball hole provided therein of a larger diameter than the through-hole and connected thereto by a frustro conical ball seat; a connector partially insertable in the check ball hole and having a through-hole provided therein; a check ball positionable in the check ball hole and of a larger diameter than the through-hole in the check valve; and an internal check ball retainer formed from a flat strip having bends along its length in three locations to define a generally M-shaped configuration with a pair of parallel portions connected by a generally V-shaped portion, said internal check ball retainer held in the check valve by the connector with the top of the M-shaped portion proximate the through hole in the connector and retaining the check ball between the pair of parallel portions.

5. The improvement as claimed in claim 4 wherein the check ball hole provided in the check valve is longer than the engaged length of the connector and the length of the parallel portions are equal to the differences in the length therebetween.

6. The improvement as claimed in claim 4 wherein the internal check ball retainer is of the rectangular cross section.

* * * * *